Patented July 27, 1948

2,445,776

UNITED STATES PATENT OFFICE 2,445,776

CONDITIONED NAPHTHALENE

Hubert G. Guy, Pittsburgh, Pa., assignor to Koppers Company, Inc., Pittsburgh, Pa., a corporation of Delaware No Drawing. Application July 11, 1945, Serial No. 604,535

13 Claims. (Cl. 260—666.5)

The present invention relates to the conditioning of organic aromatic materials which are in a fine grained form to make them non-caking and free-flowing. More particularly the invention relates to the conditioning of crude or pure naphthalene to make it non-caking and free-flowing.

Among the distillates commonly separated in the distillation of coal tar are fractions known as naphthalene oil, anthracene oil and middle oil. These distillates are usually treated to remove substantially acid and basic constituents and are then cooled and the higher melting point materials separated by filtration or pressing. These operations produce naphthalene cake, anthracene cake, crude acenaphthene and fluorene. Naphthalene cake may contain in addition to naphthalene, methyl and dimethyl naphthalenes, diphenyl and other compounds. The anthracene cake comprises anthracene, carbazole, phenanthrene, and other compounds. By chemical and physical methods it is possible to separate and secure these individual constituents. All of these constituents have insecticidal properties and probably could be used in the dry granular state as dusting insecticides if satisfactory methods of handling them could be found.

Naphthalene and anthracene are commercially available in a large number of different grades. For example naphthalene comes in the commercial grades as 72°, 74°, 76° and 78° and refined naphthalene. The 72° naphthalene is a crude naphthalene product melting not under 72° C. and usually comprises 75% to 85% naphthalene. 74° naphthalene is a crude product containing from 80% to 90% naphthalene. The melting point as a grade designation is not entirely dependent on the naphthalene content since small quantities of the impurities may affect the melting point. The 76° and 78° grades have correspondingly higher naphthalene contents.

Naphthalene, anthracene and the other hydrocarbons boiling in this range are known to be useful for the control of pests of agricultural crops but their use has been handicapped because of the tendency of the pure or crude materials to cake on storage due principally to the oily, waxy nature of the products. The unfavorable physical qualities of these materials have prevented their uniform distribution as insecticides and has also made it difficult to handle and store them. It has now been found that these difficulties can be minimized, or eliminated through the addition of relatively small amounts of specific conditioning agents which are thoroughly mixed with the naphthalene and anthracene.

Other organic aromatic hydrocarbons which are water insoluble and which are usually associated with oils in their refining operation are methylnaphthalene, 2,3-dimethyl-3-methylfluorene, phenanthrene, carbazole and fluoranthene. Most of these compounds have insecticidal properties and exist as fine grained crystalline or amorphous solids. It is also important to condition these compounds or mixtures of them in order to make them non-caking and free-flowing if they are to be used as pest control agents.

Crude naphthalene generally contains so-called impurities which are themselves good insecticides. The crude naphthalenes have many properties especially for agricultural use, which are just as effective as the refined naphthalene and in some cases more so. However, the crude naphthalene has not been widely used because of the caking and lumping nature of the product despite the low cost.

It is recognized that if a sufficiently large volume of free-flowing inert material is mixed with the crude naphthalene the mixture will be free-flowing, but such a mixture is not a commercially practicable product because such a large amount of inert material (75% to 90%) must be handled in order to make the insecticidal properties available. Further, excessive cost is entailed in packaging, transporting and handling such a mixture.

The primary object of the present invention is to condition finely granular water-insoluble aromatic compounds to make them free-flowing and non-caking.

Another object of the invention is to condition a granular crude or pure naphthalene or anthracene to make it free-flowing and non-caking.

With these and other objects in view, the invention consists in the non-caking, free-flowing, aromatic granular materials hereinafter described and particularly defined in the claims.

The coal tar hydrocarbons, such as are separated from naphthalene and anthracene oils, as well as synthetic naphthalene and anthracene, have long been employed in the pest control field either alone or in combination with insecticides and fungicides, such as nicotine, rotenone, sulphur, pyrethrum and the like. Although the materials may be used in liquid form they are widely used in solid form in a finely granular state to provide dusting powders. Naphthalene has been reported to be useful for the control of agricultural pests by various investigators, in addition to its well known use as a clothes moth control agent. Due to the peculiar physical properties of these coal tar chemicals their use as dusting materials in the past has been limited due to the fact that they form lumps and cakes while in storage and these lumps cannot be advantageously used as a dusting material. The less expensive crude naphthalenes are recommended by scientists for the control of wire worms in potatoes and other crops, but such crude materials have more of the oily materials associated therewith and have a greater tendency to become lumpy than the pure naphthalene. Furthermore under slight pressure even the refined, pure products will form solid lumps as, for example, mothballs. It is important, therefore, to make these insecticide, granular materials free-flowing and non-caking. It is also necessary to assure uniform application of these crystalline or fine-grained products to the affected areas in order to avoid plant injury. In addition to the commercial farmer it is advantageous for the small gardener and greenhouse operator to obtain conditioned aromatic hydrocarbon insecticides in small packages.

The lumping and caking characteristics of the aromatic hydrocarbons is well known and appears to be assisted by the presence of other hydrocarbons naturally associated therewith which have an oily nature. Also there is a tendency of the highly refined crystals to cake and harden due to the peculiar nature and shape of the crystals. Any conditioning agent, therefore, to be useful for both crude and refined aromatic hydrocarbon products must overcome both the caking tendency of the crystals themselves as well as the effect that is attributed to the oily types of impurities or associated ingredients.

Conditioning agents for use with crude or refined aromatic hydrocarbon products should mix intimately with the products and remain so mixed during storage. A comparatively small amount of conditioning agent should be required to produce a finished product and maintain the finished product free-flowing after storage under reasonable pressures and ordinary temperatures. It has been found that such free-flowing powders can be obtained by the addition of small amounts of naturally occurring or synthetically produced magnesium compounds, such as magnesium carbonate, magnesite, and magnesium phosphate. Some clays have been found to produce a satisfactory product, but all clays are not satisfactory. Clay, such as fuller's earth, Perry and Tower clays, and kaolin have been found to be satisfactory as conditioning agents and it has been found that each of these products may be substituted for the other.

The magnesium compounds are effective in concentrations of 4% to 10% whereas the clays are more effective in concentrations of 5% to 15%.

It is not known why materials with different characteristics such as are possessed by the natural and synthetic magnesium compounds on the one hand and the aforementioned clays on the other hand, function as conditioning agents for crude and pure naphthalene and anthracene. It is especially surprising that when the preferred magnesium compounds and clays are combined they are very effective as conditioning agents. In addition, it is also important economically to know that these effective combinations comprise considerably smaller proportions of the magnesium compounds and clays than when the same are used separately. Some kind of additive conditioning effect is apparently present. Effectively conditioned naphthalene and anthracene can be obtained by admixture therewith of from 1% to 3% magnesium compounds plus 5% to 10% of the preferred clays.

Both the crude and refined grades of naphthalene and anthracene can be conditioned in simple manner by mixing the same in any commercial mixing equipment such as a pulverizer, paint mill, pebble mill, or the like, with the proper proportions of the conditioning agents. Resulting products can be screened, if necessary, and then bagged for storage and shipment. The conditioned materials can be dispensed as required by the usual agricultural machinery or by hand. When sprayed through commercial dusters they spray very easily, leaving a fine, evenly blended powdery coating.

The conditioned materials have been found to remain free-flowing after storage at temperatures as high as 100° F. and under pressures as great as two pounds per square inch. While it is true that some caking occurs under this pressure, such lumps are soft and can be easily broken up without the use of special machinery. The materials are suitable for application to the soil or to growing crops, as is, or by further dilution with hydrated lime, clay, fertilizer, nicotine, rotenone, pyrethrum, or other organic and inorganic insecticides and fungicides.

The following specific examples illustrate certain formulations made up by mixing the previously described conditioning agents with naphthalene in a pulverizing machine equipped with a rotary screen having 1 mm. openings. The conditioned products were then examined for their quality which included an examination for separation of constituents, free-flow, and caking. After this the products were stored for a week in paper bags at room temperature and thereafter again examined for their quality. The following table lists the formulations in parts by weight and the results of the quality examinations before and after storage. Pure naphthalene is designated (P) whereas crude naphthalene (90% naphthalene melting at 74° C.) is designated (C). The ratings from excellent to very poor are of course relative but can be described as follows: excellent—very little lumping or caking, free-flowing, even mixture; good—slight tendency to form soft lumps; fair—a definite tendency toward lumping; poor—definite fragile lumps formed; very poor—sample solidly caked.

| Formulation | | Before Storage | | After Storage | | Remarks |
|---|---|---|---|---|---|---|
| | | Quality | Caking | Quality | Caking | |
| Bentonite | 10 | good | none | poor | slight | large lumps. |
| Naphthalene P | 90 | | | | | |
| Starch | 10 | poor | marked | very poor | marked | hard lumps. |
| Naphthalene P | 90 | | | | | |
| Magnesium carbonate | 4 | excellent | none | excellent | none | |
| Naphthalene P | 78 | | | | | |
| Clay | 18 | | | | | |
| Pyrophyllite | 10 | good | do | do | do | |
| Naphthalene P | 90 | | | | | |
| Perry Clay | 10 | do | do | do | do | |
| Naphthalene P | 90 | | | | | |
| High magnesium limestone | 10 | do | do | poor | slight | coarse lumps. |
| Naphthalene P | 90 | | | | | |
| Magnesium oxide | 4 | excellent | do | excellent | do | soft lumps. |
| Naphthalene C | 78 | | | | | |
| Tower Clay | 18 | | | | | |

| Formulation | | Before Storage | | After Storage | | Remarks |
|---|---|---|---|---|---|---|
| | | Quality | Caking | Quality | Caking | |
| Tobacco dust | 20 | good | none | fair | slight | small lumps. |
| Tower Clay | 30 | | | | | |
| Naphthalene C | 50 | | | | | |
| Georgia kaolin | 22 | do | do | excellent | none | |
| Naphthalene C | 78 | | | | | |
| Bentonite | 22 | do | do | very poor | marked | large lumps. |
| Naphthalene C | 78 | | | | | |
| China Clay | 22 | do | do | excellent | slight | soft lumps. |
| Naphthalene C | 78 | | | | | |
| Perry Clay | 22 | fair | do | do | do | lumps. |
| Naphthalene C | 78 | | | | | |
| Fuller's earth | 22 | good | do | do | none | excellent. |
| Naphthalene C | 78 | | | | | |
| Tower Clay | 22 | do | do | do | do | soft lumps. |
| Naphthalene C | 78 | | | | | |
| Magnesium carbonate | 4 | do | do | do | do | |
| Naphthalene C | 78 | | | | | |
| Magnesium carbonate | 2 | excellent | do | fair | slight | large lumps. |
| Fuller's earth | 3 | | | | | |
| Naphthalene C | 95 | | | | | |
| Magnesium carbonate | 2 | good | do | poor | do | Do. |
| Naphthalene C | 98 | | | | | |
| Fuller's earth | 4 | do | do | do | do | Do. |
| Naphthalene C | 96 | | | | | |
| Magnesium carbonate | 2 | excellent | do | excellent | none | excellent. |
| Fuller's earth | 8 | | | | | |
| Naphthalene C | 90 | | | | | |
| Magnesium carbonate | 2 | do | do | do | do | |
| Tower Clay | 8 | | | | | |
| Naphthalene C | 90 | | | | | |
| Magnesium carbonate | 1 | good | do | good | slight | soft lumps. |
| Fuller's earth | 4 | | | | | |
| Naphthalene C | 95 | | | | | |
| Fuller's earth | 15 | excellent | do | excellent | none | |
| Naphthalene C | 85 | | | | | |
| Naphthalene C | 90 | good | do | good | slight | lumpy. |
| Talc | 10 | | | | | |

The product which is made up of 2% of magnesium carbonate, 8% fuller's earth and 90% crude naphthalene gave an effective product which is very superior as a dust insecticide. This product, when placed under a pressure of two lbs. per square inch for two hours, did not tend to cake or form lumps. It has been found that about 15% of a clay is required to give the same conditioning properties to naphthalene as a mixture of 2% magnesium carbonate and 8% of clay.

Many other inerts, clays, and like materials such as the cork and starch were tested and found to give poor results. Hydrated lime (Ca(OH)$_2$) was a good conditioner in a 50-50 mixture but was a poor conditioner with 15% or less of Ca(OH)$_2$. Similar results were obtained with other materials. It will be noted that some formulations had a better quality after the storage period than before and vice versa. The tabulation shows that the preferred magnesium carbonate and magnesium oxide in concentration upwards of 2% and the fuller's earth, Perry and Tower clays, kaolin, and pyrophyllite in concentrations upwards of 4% can be employed with fair results. However, with these noted lower limits of 2% and 4% respectively as mixtures, the conditioned naphthalene is excellent or good in quality for all these materials.

I claim:

1. A free-flowing powdered composition comprising at least one coal tar hydrocarbon chosen from such hydrocarbons that are usually present in the naphthalene to anthracene boiling ranges having a melting point above 70° C. and 2% to 5% of a conditioning agent chosen from the group consisting of magnesium carbonate, magnesite, magnesium oxide, and magnesium phosphate.

2. A free-flowing powdered composition comprising at least one coal tar hydrocarbon chosen from such hydrocarbons that are usually present in the napththalene to anthracene boiling range having a melting point above 70° C., 1% to 5% of a conditioning agent chosen from the group consisting of magnesium carbonate, magnesite, magnesium oxide, and magnesium phosphate, and 4% to 22% of a conditioning agent chosen from the group of clays consisting of fuller's earth, Perry clay, Tower clay, kaolin and pyrophyllite.

3. A free-flowing powdered composition comprising a naphthalene product containing at least 75% naphthalene and 2% to 5% of a conditioning agent chosen from the group consisting of magnesium carbonate, magnesite, magnesium oxide, and magnesium phosphate.

4. A free-flowing powdered composition comprising a naphthalene product containing at least 75% naphthalene, 1% to 5% of a conditioning agent chosen from the group consisting of magnesium carbonate, magnesite, magnesium oxide, and magnesium phosphate, and 4% to 22% of a conditioning agent chosen from the group of clays consisting of fuller's earth, Perry clay, Tower clay, kaolin, and pyrophyllite.

5. A free flowing powdered composition comprising a coal tar product containing at least one coal tar hydrocarbon chosen from such hydrocarbons as are usually present in the naphthalene to anthracene boiling ranges, having a melting point about 70° C. having intimately mixed therewith at least 5% of fuller's earth.

6. A free flowing powdered composition comprising a coal tar product containing at least one coal tar hydrocarbon chosen from such hydrocarbons as are usually present in the naphthalene to anthracene boiling ranges, having a melting point about 70° C. having intimately mixed therewith at least from 5 to 22% of fuller's earth.

7. A free flowing powdered composition comprising a coal tar product containing at least one coal tar hydrocarbon chosen from such hydrocarbons as are usually present in the naphthalene to anthracene boiling ranges, having a melting point about 70° C. having intimately mixed therewith at least 4% of fuller's earth and at least 1% of a magnesium compound selected from the class consisting of magnesium carbonate, magnesite, magnesium oxide, and magnesium phosphate.

8. A free flowing powdered composition comprising a coal tar product containing at least one coal tar hydrocarbon chosen from such hydrocarbons as are usually present in the naphthalene to anthracene boiling ranges, having a melting point about 70° C. having intimately mixed therewith at least from 4 to 10% of fuller's earth and from 1 to 3% of a magnesium compound selected from the class consisting of magnesium carbonate, magnesite, magnesium oxide and magnesium phosphate.

9. A free flowing powdered composition comprising a powdered naphthalene product containing at least 75% naphthalene having intimately mixed therewith at least 5% of fuller's earth.

10. A free flowing powdered composition comprising a powdered naphthalene product containing at least from 5 to 22% of fuller's earth.

11. A free flowing powdered composition comprising a powdered naphthalene product containing at least 4% of fuller's earth and at least 1% of a magnesium compound selected from the class consisting of magnesium carbonate, magnesite, magnesium oxide and magnesium phosphate.

12. A free flowing powdered composition comprising a powdered naphthalene product containing at least from 4 to 10% of fuller's earth and from 1 to 3% of a magnesium compound selected from the class consisting of magnesium carbonate, magnesite, magnesium oxide and magnesium phosphate.

13. A free flowing powdered composition comprising a powdered naphthalene product containing at least about 8% of fuller's earth and about 2% of magnesium carbonate.

HUBERT G. GUY.

REFERENCES CITED

The following references are of record in the file of this patent:

UNITED STATES PATENTS

| Number | Name | Date |
|---|---|---|
| 514,235 | Molyneux | Feb. 6, 1894 |
| 790,902 | Kirkham et al. | May 30, 1905 |
| 1,801,144 | Engleman et al. | Apr. 14, 1931 |
| 1,819,953 | Funk | Aug. 18, 1931 |
| 1,941,055 | Renard | Dec. 26, 1933 |
| 2,136,868 | Schotytl et al. | Nov. 15, 1938 |